United States Patent
Mutka et al.

[11] Patent Number: 5,905,039
[45] Date of Patent: *May 18, 1999

[54] LOGISTIC METHOD IN A TUNNEL-COMPOSTING PLANT AND A CORRESPONDING TUNNEL COMPOSTING PLANT

[75] Inventors: Kari Mutka; Kauko Isomottonen, both of Jyvaskyla, Finland

[73] Assignee: Vam Vapo Wastech Ltd Oy, Jyvaskyla, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,030

[22] Filed: Oct. 30, 1996

[30] Foreign Application Priority Data

| Nov. 1, 1995 | [FI] | Finland | .................................... 955217 |
| Dec. 8, 1995 | [FI] | Finland | .................................... 955891 |
| Jun. 25, 1996 | [FI] | Finland | .................................... 962625 |

[51] Int. Cl.⁶ .................................................. A01D 90/10
[52] U.S. Cl. ............................................ 435/290.1; 71/13
[58] Field of Search ................. 71/8, 9, 10, 12, 71/13, 15, 21; 435/290.1, 290.4

[56] References Cited

U.S. PATENT DOCUMENTS

| 4,339,265 | 7/1992 | Engelmann | .................................... 71/9 |
| 5,129,935 | 7/1992 | Cerroni | ......................................... 71/9 |
| 5,204,263 | 4/1993 | Finn | ................................................. 71/9 |
| 5,405,092 | 4/1995 | Jonninen | .................................. 241/27 |
| 5,441,552 | 8/1995 | DeLillo | ......................................... 71/9 |
| 5,628,812 | 5/1997 | Tempe | ........................................... 71/9 |
| 5,666,890 | 9/1997 | Craig | ....................................... 110/229 |

FOREIGN PATENT DOCUMENTS

| 0541 184A1 | 5/1993 | European Pat. Off. . |
| 4014283A1 | 11/1991 | Germany . |
| 4240054C1 | 1/1994 | Germany . |
| WO92/18611 | 10/1992 | WIPO . |

*Primary Examiner*—Michael Lewis
*Assistant Examiner*—Stuart L. Hendrickson
*Attorney, Agent, or Firm*—Fildes & Outland, P.C.

[57] ABSTRACT

A logistic method for transporting and handling materials in a tunnel composting plant, as well as the plant itself includes bringing materials for tunnel composting to the plant. The materials are unloaded into intermediate collection points and compostable material is treated from the materials brought also according to the current recipe. The composting materials are transferred to a composting tunnel that is free at the time, and after composting the composted material is transferred from the composting tunnel to a heap of finished material at its own collection point. Composted material is transported from the heap of finished material to the desired point of use. According to the method, essentially all of the handling of all the materials at the plant is carried out using a wheeled loader, equipped with a mixing and crushing bucket.

8 Claims, 2 Drawing Sheets

LOGISTIC METHOD IN A TUNNEL-COMPOSTING PLANT AND A CORRESPONDING TUNNEL COMPOSTING PLANT

BACKGROUND OF THE INVENTION

This invention relates to a logistic method in a tunnel-composting plant for the transportation and handling of the materials, in which method the materials brought to the plant for composting, dried municipal sludges, separately collected organic wastes, industrial organic wastes and/or dried sludges, as well as the supporting and/or mixing materials required by the composting process, such as woodchips, bark and/or peat, are unloaded at intermediate collection points, and a compostable material is mixed, sieved, and crushed, according to the current recipe, from the materials collected, and the materials to be composted are transferred to form a batch for composting in the composting tunnel that is currently free, and each batch is composted in the composting tunnel with the aid of powerful air circulation directed through the material, after composting, the composted batch of finished material is transferred from the composting tunnel to a heap of finished material at its own collection point, the composted material is transported from the heap of finished material to the desired point of use for possible further maturing.

In a tunnel composting plant there are usually several parallel composting tunnels or reactors, into which the material to be composted, together with the support and mixing materials, is transferred. The base has air-holes, through which a strong flow of air is blown through the material, the air being generally recirculated through a gas washer back to the composting tunnel. The finished material is transferred to a further composting stockpile, where it is allowed to finally mature. After this, the material is taken to be used directly either as fertilizer, or as soil improvement material, or else it receives further treatment for other purposes.

The materials brought to the plant vary widely in their treatability. Often organic waste demands considerable pretreatment, particularly crushing, before it can be fed to the process. It is also often necessary to sieve several components. On the other hand, support and mixing materials, such as woodchips, bark, and peat are generally quite easy to handle. In known composting plants handling municipal or industrial organic waste, there is a considerable amount of various mixing, crushing, and other pretreatment equipment, which prepares the material to be transferred to the composting tunnel. The movement of material in these plants takes place mainly by means of special conveyor devices, which move the mixed material, for example, from an intermediate storage silo to a composting tunnel. The composting tunnel itself generally also includes its own mixing and transfer devices. In these plants, the material is also often removed from the composting tunnel by means of special transfer devices.

Tunnel composting plants, in which conveyor equipment is used to transfer the material to the composting tunnel and from it, are known from German patent publications DE 2937390, DE 2948176 (=FI67685) and DE 2809344.

In small plants that mainly compost garden waste, the material need not be mixed, sieved, or crushed. In some plants of this kind, the garden waste is transferred as such to and from the composting tunnel by means of an ordinary wheeled loader. Plants of this kind are not suitable for materials that are more difficult to handle, such as, for example, organic waste and dried sludge.

There are certain basic costs attached to the handling of the material and conveyor equipment, due to which these form a very large part of costs, especially in small plants. As the size of the plant increases, the costs of the mixing, sieving, crushing, and conveyor equipment grow quite slowly when compared, for example, to construction costs.

In small plants, the emptying and filling of the composting tunnel take place, for instance, once a week. This means that the sieving, crushing, mixing, and conveyor equipment stands idle for most of the time.

If good quality material is wanted, the composted material must be crushed and mixed one more time, before being put on the heap for further maturing.

This invention is intended to create a new kind of logistic method for handling and transporting the aforementioned difficult materials in the process in a tunnel composting plant. According to the method, the materials brought to the plant for composting, dried municipal sludges, separately collected organic wastes, industrial organic wastes and/or dried sludges, as well as the supporting and/or mixing materials required by the composting process, such as woodchips, bark and/or peat, are unloaded at intermediate collection points. A compostable material is mixed, sieved, and crushed, according to the current recipe, from the materials collected, and the materials to be composted are transferred to form a batch for composting in the composting tunnel that is currently free.

Each batch is composted in the composting tunnel with the aid of powerful air circulation directed through the material. After composting, the composted batch of finished material is transferred from the composting tunnel to its own collection point. The composted material is transported from its aforementioned collection point to the desired point of use for possible further maturing.

The intermediate collection points of the materials to be handled and the collection point of the finished material are established on a loading base capable of supporting a vehicle, each as a heap with free access for the bucket of the implement from at least one side. Each composting tunnel has a floor capable of supporting a vehicle and a door equipped with an access opening permitting the transfer of the material by a wheeled vehicle. Essentially all the handling of the materials at the plant, i.e. mixing, sieving, crushing, and transfer between the intermediate collection points, the composting tunnels, and the collection point for the finished material, is carried out using a wheeled loader equipped with a mixing and crushing bucket, so that a single wheeled loader of this type can carry out essentially all of the aforementioned work stages. Accordingly the compostable material is mixed by the aforesaid bucket so effectively, that intermediate mixing is not necessary in the composting tunnel during composting.

A tunnel composting plant according to the invention, includes at least one tunnel composting tunnel, devices for circulating air through the material stored in the composting tunnel, intermediate collection points, for the materials brought to the plant for treatment, a collection point for finished, outgoing material, implements for mixing, sieving, and crushing the materials being handled, implements for transporting the material to the composting tunnel, and implements for transporting composted materials from the composting materials to its own collection point. Therein the tunnel-composted materials are dried municipal sludges, separately collected organic wastes, industrial organic wastes and/or sludges, and on the other hand support and mixing materials such as, for example, peat, woodchips, and bark.

The intermediate collection points for the materials to be handled and the collection point for the finished material are, in their structure, loading bases capable of supporting a vehicle and each is a heap with free access from at least one side for the bucket of an implement. Each composting tunnel has a floor capable of supporting a vehicle and a door equipped with an opening permitting the transfer of material by means of a wheeled vehicle. The aforementioned implements for handling and transporting the materials, i.e. the implements for mixing, sieving, crushing, and transporting the materials consist of at least one wheeled loader, equipped with a mixing and crushing bucket.

Nowadays, wheeled loaders, equipped with a mixing bucket, that are as such known, can carry out many work stages that previously required several different machines. In addition, the same machine can be used to carry out treatments taking place in different places, for example, crushing at the beginning and end of the process—an arrangement that would have been impossible earlier in a plant equipped with fixed conveyor devices. Thus a single wheeled loader can replace a large amount of fixed handling equipment, such as a crusher, sieve, and mixer, and conveyors. Particularly if the plant uses an outside contractor, the plant need not invest in handling and transfer equipment that stands idle for long periods, and the place of which is here taken by a single wheeled loader.

Other advantages and characteristics of the invention will become obvious from the examples of embodiments described later.

In what follows, the invention is described with reference to the accompanying Figures, which show one tunnel composting plant according to the invention, particularly its logistics.

DETAIL DESCRIPTION OF THE DRAWINGS

Figure 1:
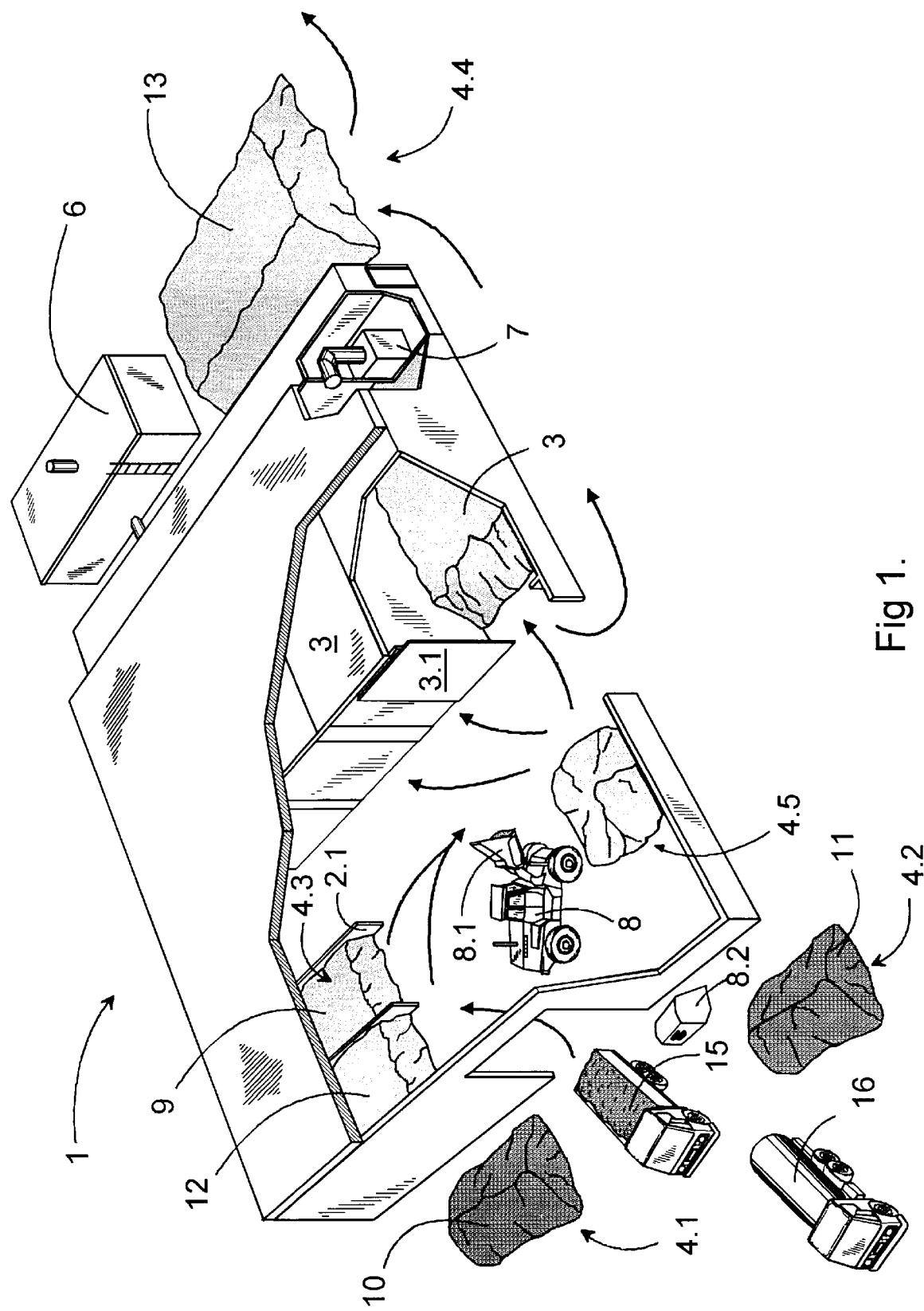
FIG. 1 shows one tunnel composting plant with material treatment diagrams.

The tunnel composting plant in FIG. 1 includes a tunnel composting building and an organic filter unit 6, intermediate collection points 4.1 and 4.2, and a finished material collection point 4.4, which are made on a loading base capable of supporting a vehicle, as well as a wheeled loader 8 equipped with a multipurpose mixing bucket 8.1. In the tunnel composting building, there are composting tunnels 3, air-conditioning devices 7 for them, and reception bays 2.1. In the Figure, a third intermediate collection point 4.3 is marked in one bay, by way of example.

Organic waste and sludge are brought by their own trucks 15 and 16 to their own bays 2.1. Peat, woodchips, and bark material can, according to the Figure, be unloaded onto the loading bases capable of supporting a vehicle and located out of doors. The size and shape of the intermediate storage points can vary depending on different cases, but the wheeled loader must have free access with its bucket to each heap, from at least one side. The intermediate storage points for organic waste and sludge can be established in a closed store indoors, especially because of odors.

Peat material 10, bark material 11, organic waste 12, and sludge material 9 are marked in FIG. 1 as materials to be brought inside, by way of example. The sludge that is suitable for composting has been dried, in which case its solids content is 10–30%. The plant may also handle weak sludges, when the sludge is brought to the plant with a solids content of 1–3%.

Composting materials, organic waste 12, and sludge 9 demand the aforementioned support and mixing materials, peat or bark, which form a source of carbon during composting and aerate the material. The composting process thus requires the effective mixing of the introduced materials according to the recipe demanded by the process and their transportation to composting tunnel 3. According to the invention, intermediate mixing is not required during the composting itself. This is further helped by the fact that the average height of the filling is 2.0–3.2 m, when the compaction of the material creates a small degree of mechanical working.

The finished material is taken from the composting tunnel 3 to the collection point 4.4, where a final maturing heap 13 is formed. The material is crushed and mixed one more time at this stage.

Organic material brought in must be crushed. This takes place either as a separate work stage, or else in connection with mixing. In the case in FIG. 1, the basic materials are mixed by taking predetermined amounts of them and transporting to intermediate storage point 4.5, where different components are taken into the bucket in turn and the mixing bucket is then started, when they flow through the bucket and back into the heap. Pieces that are too large remain in the bucket and are set aside. This is repeated a sufficient number of times, so that the material mixes and homogenizes. The homogenized material is transported by the wheeled loader to the composting tunnel 3, where the material is once again mixed using a crushing and mixing bucket 8.1.

As the circulation of each composting tunnel in a small composting plant according to the invention is 7–14 days, with three composting tunnels, it is possible to employ an outside contractor, who comes roughly every third day to empty one composting tunnel into the final maturing heap. At the same time, the contractor mixes and crushes the material once more. After this, he goes on to prepare a new material, when he crushes and mixes the basic materials and transfers the mixture to the free composting tunnel. Once composting tunnel 3 has been filled, its doors 3.1 are closed and the process is started. In about three days time, it is the turn of the next composting tunnel.

From the point of view of the plant, the central implement is a wheeled loader 8 equipped with a mixing and crushing bucket 8.1. The wheeled loader itself may be either a tractor, or a heavier chassis-steered wheeled vehicle. The mixing bucket 8.1 is advantageously a sieve-crusher according to the Finnish utility model No. 749, in which several rotatable crushing members are arranged on opposing axes on the rear wall of the bucket. Another possible mixing bucket is also presented in Finnish Patent 91718. Although a single wheeled loader can carry out all the work stages, the plant may have a second machine in reserve, in case of possible mechanical breakdowns. The problem presented by mechanical breakdown is reduced by the fact that the plant can use a wheeled loader of a standard type, which is generally readily available.

Figure 2:
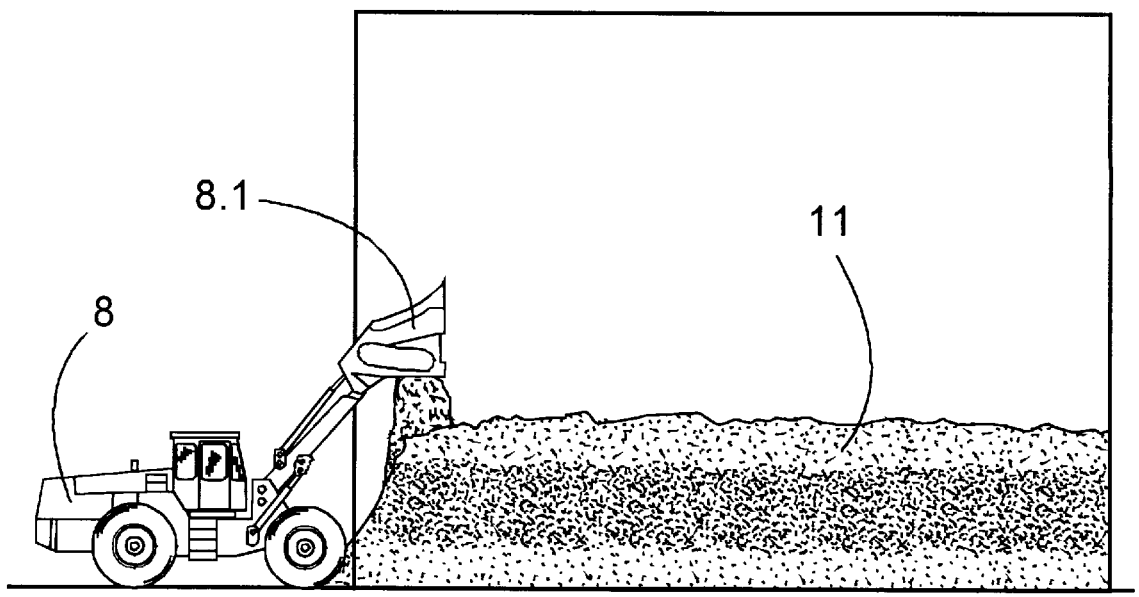
FIG. 2 shows one advantageous manner of mixing materials.

The manner of premixing the material shown in FIG. 2 does not require a separate mixing place at all, instead the material brought for composting, for example organic waste 12, is unloaded on top of the bark material 11. A second layer of bark material is spread on top. In this way a mixture according to the recipe is obtained for the composting process. According to FIG. 2, the heap is taken apart by means of wheeled loader 8, starting from the end, so first the layers are mixed using the bucket 8.1 while the coarser material becomes crushed. After this, the mixed material is transferred to a composting tunnel.

Because the handling of the materials also includes simple transportation of the materials without mixing, the tunnel composting plant advantageously includes at least one conventional push-fit bucket 8.2 to be attached to the wheeled loader in place of the mixing bucket, when greater capacity is available for transportation. In practice, the wheeled loader and its buckets can by owned by the outside contractor, though in terms of process technique and logistics it forms an essential part of the tunnel composting plant.

In a very large plant, the capacity of the composting tunnels may be increased by emptying two composting tunnels into a single tunnel in the middle of the process.

In a plant manufacturing fuel, which is located next to the power plant using the fuel, the composted material is emptied by a wheeled loader from the composting tunnel straight into the power plant's fuel silo, or similar storage space. Here too, the crushing of the lumps in the material homogenizes the fuel.

While the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method of carrying out a composting process in a tunnel composting plant, the method consisting essentially of steps of: receiving materials to be composted and materials to aid a composting reaction and placing the materials at predetermined collection points; mixing, crushing and sieving the various materials together in accordance with a prescribed recipe to form a compostable mixture and transferring the mixture to an intermediate collection point; transferring a batch of the compostable mixture from the intermediate collection point to a composting tunnel; composting the mixture in the tunnel for a determined period of days while recirculating air through the mixture; and transporting the composted mixture to a final collection point;

wherein the improvements consist essentially of:
establishing said collection points on a loading base at locations accessible by a wheeled loader vehicle;
providing said composting tunnel with a floor and a closable access opening accessible by said loader vehicle;
conducting all mixing, crushing and sieving operations of said composting process in a mixing bucket carried by said loader vehicle, said bucket having loading, mixing, crushing and depositing capability;
conducting all transferring operations of said composting process in a bucket carried by a loader vehicle;
mixing said compostable materials prior to composting so completely that composting in said tunnel proceeds without further mixing during said determined period in the tunnel; and
composting said batch of compostable mixture in said composting tunnel without mixing during said determined period.

2. A method according to claim 1 wherein said compostable mixture is heaped in said composting tunnel to a height in the range of from 2–3.2 meters to create some mechanical working in the heap through compaction of the heaped material.

3. A method according to claim 1 wherein:
said step of receiving materials includes unloading at least one of the materials to be composted and at least one of the materials to aid a composting reaction in layers, one on top of the other, at one of said collection points; and
said step of mixing, crushing and sieving includes scooping portions of both layers into a mixing bucket and mixing, crushing and sieving the portions together in the bucket.

4. A method according to claim 1, for use in a plant manufacturing soil improvement material, wherein said step of transporting the composted mixture includes mixing and crushing the composted mixture in a mixing bucket carried by a wheeled loader vehicle and depositing the additionally mixed mixture at said final collection point.

5. A method according to claim 1, for use in a plant manufacturing fuel for an adjacent power plant, wherein said final collection point to which the composted mixture is transported is the fuel storage space of said power plant.

6. A method according to claim 1 wherein said composting plant includes a plurality of buckets attachable to a conventional wheeled loader vehicle, said buckets including at least one mixing bucket and one larger transporting bucket so that a single wheeled loader can carry out all the mixing, transferring and transporting operations included in the method.

7. A tunnel composting plant for treating materials such as dried municipal sludges, separately collected organic wastes, and industrial organic wastes and/or sludges together with support and mixing materials such as peat, wood chips, and bark, said plant consisting essentially of at least one composting tunnel, devices for circulating air through compostable material stored in the composting tunnel, intermediate collection points for materials brought to the plant for treatment, a collection point for finished outgoing material, implements for mixing, sieving, and crushing materials being handled, implements for transporting materials to the composting tunnel, and implements for transporting composted materials from the composting tunnel to said final collection point, and the improvement wherein said intermediate and final collection points consist essentially of loading bases capable of supporting a vehicle and a heap of material, said loading bases each having free access from at least one side for a bucket of an implement;
each composting tunnel has a floor capable of supporting a vehicle and a door opening permitting the transfer of material by a wheeled vehicle; and
said implements for handling, mixing sieving and crushing, and transporting materials consist of at least one wheeled loader, each said loader equipped with a bucket and at least one of said buckets being a mixing and crushing bucket.

8. A tunnel composting plant according to claim 7 wherein said implements include at least one wheeled loader equipped with only a single mixing and crushing bucket.

* * * * *